US010911219B2

(12) United States Patent
Ardashev et al.

(10) Patent No.: US 10,911,219 B2
(45) Date of Patent: Feb. 2, 2021

(54) HIERARCHICAL BLOCKCHAIN CONSENSUS OPTIMIZATION SCHEME

(71) Applicant: INTERNATIONAL BUSINESS MACHINES CORPORATION, Armonk, NY (US)

(72) Inventors: Ruslan Ardashev, Rocky Point, NY (US); Nitin Gaur, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 15/829,567

(22) Filed: Dec. 1, 2017

(65) Prior Publication Data

US 2019/0173666 A1    Jun. 6, 2019

(51) Int. Cl.
*H04L 9/06*     (2006.01)
*H04L 9/32*     (2006.01)
(52) U.S. Cl.
CPC .......... *H04L 9/0637* (2013.01); *H04L 9/3239* (2013.01); *H04L 2209/38* (2013.01)
(58) Field of Classification Search
CPC ....... H04L 9/0637; H04L 9/0643; H04L 9/32; H04L 9/3239
See application file for complete search history.

(56) References Cited

U.S. PATENT DOCUMENTS 9,419,854 B1 *  8/2016  Wang .................. H04L 41/00
9,553,982 B2    1/2017  Unitt
9,569,771 B2    2/2017  Lesavich et al.
2014/0310243 A1 * 10/2014  McGee ................ G06Q 10/101
                                                    707/639

(Continued)

FOREIGN PATENT DOCUMENTS

CN         107147735 A  *  9/2017

OTHER PUBLICATIONS

Croman et al., "On Scaling Decentralized Blockchains (A Position Paper)", IC3, The Initiative for CrypoCurrencies and Contracts, 2016, 16 Pages, www.initc3.org/publications.html.

(Continued)

*Primary Examiner* — Kristine L Kincaid
*Assistant Examiner* — Shaqueal D Wade
(74) *Attorney, Agent, or Firm* — Anthony M. Pallone

(57) ABSTRACT

An embodiment of the invention may include a method, computer program product and system for consensus optimization. The embodiment may include implementing a hierarchy of computing nodes. The hierarchy includes a plurality of levels. An nth level includes a plurality of subgroups of computing nodes. Each subgroup contains a leader computing node. An n+1 level includes all of the leader computing nodes of the nth level. The embodiment may include transmitting messages from a first computing node to a second computing node. The second computing node is within a same subgroup of the first computing node. The embodiment may include transmitting messages from the first computing node to a third computing node. The third computing node is a leader computing node from a different subgroup of the first computing node. The embodiment may include determining a consensus. The consensus is determined by computing nodes located at a highest level.

14 Claims, 7 Drawing Sheets

(56) References Cited

U.S. PATENT DOCUMENTS

2016/0191243 A1   6/2016 Manning
2016/0342304 A1* 11/2016 Kodavali ............ G06F 3/04817
2018/0349621 A1* 12/2018 Schvey .................. G06F 21/40
2020/0059369 A1*  2/2020 Li ....................... H04L 61/1511

OTHER PUBLICATIONS

Anonymous, "A System and a Method for Meta-Trust Models and Its Application to Meta-Validation of Blockchain", An IP.Com Prior Art Database Technical Disclosure, IP.Com No. IPCOM000248773, Jan. 9, 2017, 6 Pages.

Anonymous, "Mechanisms for Validating Authorization/Delegation Hierarchy Using Blockchain Technology", An IP.Com Prior Art Database Technical Disclosure, IP.Com No. IPCOM000248695, Dec. 27, 2016, 13 Pages.

Anonymous, "Method and System for a Scalable Hierarchical Concurrent Update Tree With an Optimized Response Time for Processing Transactions", An IP.Com Prior Art Database Technical Disclosure, IP.Com No. IPCOM/000249452, Feb. 27, 2017, 3 Pages.

Mell et al., "The NIST Definition of Cloud Computing", NIST, Sep. 2011, 7 Pages, Special Publication 800-145, U.S. Department of Commerce, Gaithersburg, MD.

* cited by examiner

HIERARCHICAL BLOCKCHAIN CONSENSUS OPTIMIZATION SCHEME

BACKGROUND

The present invention relates, generally, to the field of blockchain technology, and more specifically, to implementing a multi-level hierarchical mechanism for optimizing consensus.

A blockchain is a continuously growing list of transaction records, called blocks, which are linked and secured using cryptography. A blockchain may serve as a distributed digital ledger that can be used to verify data transactions in a way that is both transparent and immutable. It works by recording blocks on multiple servers (nodes), creating a distributed digital ledger of transactions (the chain). Each block is created when multiple nodes agree and validate the transactions. The ledger can only be changed when there is a consensus among the nodes.

BRIEF SUMMARY

An embodiment of the invention may include a method, computer program product and system for consensus optimization. The embodiment may include implementing a hierarchy of computing nodes. The hierarchy includes a plurality of levels. An nth level includes a plurality of subgroups of computing nodes. Each subgroup contains a leader computing node. An n+1 level includes all of the leader computing nodes of the nth level. The embodiment may include transmitting consensus-related messages from a first computing node of the plurality of computing nodes to a second computing node of the plurality of computing nodes. The second computing node is within a same subgroup of the first computing node. The embodiment may include transmitting consensus-related messages from the first computing node of the plurality of computing nodes to a third computing node of the plurality of computing nodes. The third computing node is a leader computing node from a different subgroup of the first computing node. The embodiment may include determining a consensus of the plurality of nodes. The consensus is determined by content of the consensus-related messages received by computing nodes of the plurality of computing nodes located at a highest level of the hierarchy.

DETAILED DESCRIPTION

Figure 1A:
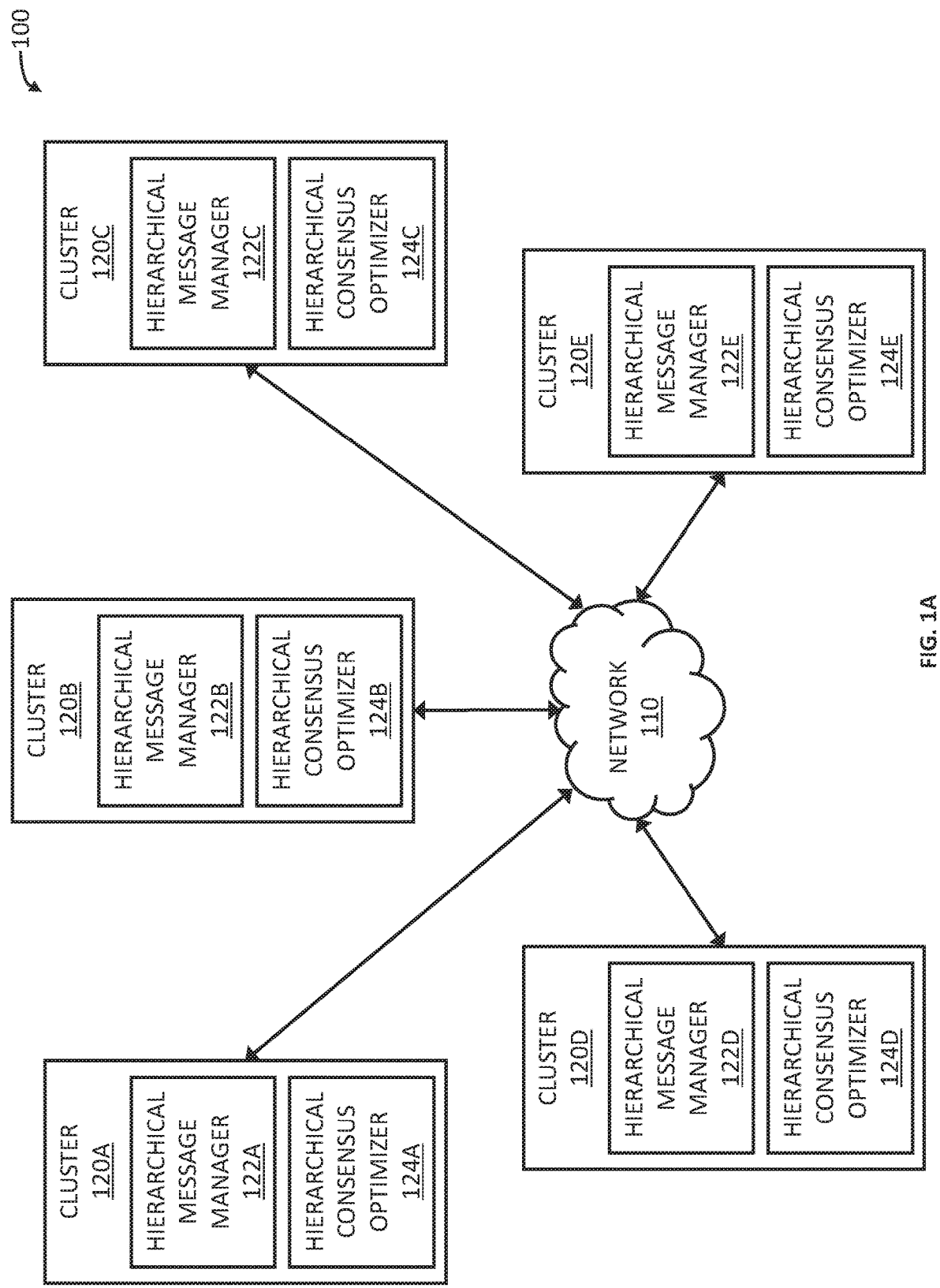
FIG. 1A is a block diagram illustrating a hierarchical consensus optimization system, in accordance with an embodiment of the present invention.

As mentioned above, a blockchain may serve as an official record keeping mechanism that can be used to verify data transactions. Blockchain, as a technology, is secure by design and may serve as an example of a distributed computing system with high Byzantine fault tolerance. The objective of a Byzantine fault tolerant system is a system able to defend against Byzantine failures in which components (e.g., nodes) of a system fail, causing other components of the system to not reach consensus among themselves, where such consensus is needed for the correct operation of the system. In one embodiment, decentralized secured transactions may be accomplished using blockchain, which uses consensus in order to agree on an order of appending transactions, or agreement amongst transactions. As a result, blockchain databases and records represent an emerging technology with the potential to radically improve banking, supply chains, and other transaction networks and record management activities.

Decentralized consensus breaks the old paradigm of centralized consensus, i.e., when one central database is used to rule transaction validity. A decentralized scheme transfers authority and trust to a decentralized network of nodes and enables the nodes to continuously and sequentially record their transactions on a public block, creating a unique chain, i.e., the blockchain. Cryptography, via hash codes, is used to secure the authentication of the transaction source and removes the need for a central intermediary. The use of cryptography in combination with blockchain technology ensures there is never a duplicate recording of the same transaction.

In current blockchain implementations system administrators are expected to choose a consensus model once. The chosen consensus model is then rigidly applied across all blockchain nodes which may lead to inefficiency and performance degradation as the number of nodes increases since consensus is required among the nodes for transaction validation. As the number of nodes on a blockchain network increases, the quantity of consensus-related messages, i.e. validation messages, increases exponentially. Consequently, the amount of time required to reach consensus among the nodes increases exponentially as well. If a system administrator were to choose a lenient consensus mechanism and connect all blockchain network nodes to each other, the quantity of consensus-related messages quickly becomes exponential and ultimately limits the size of the network given standards for performance (e.g., transactions per second ("TPS") that the blockchain network is capable of sustaining). For those using the blockchain network, the increased time required to reach consensus is reflected via highly undesired throughput decreases and latency increases. Furthermore, the time required to reach consensus may also be dependent on the dynamic nature of a blockchain network. Factors such as network growth/shrinkage, the number of transactions processed, geographical disparity between nodes, and node speed/processing power may adversely affect the time required to reach consensus and TPS. Overall, given the current approach to blockchain networks, the quality of service ("QoS") decreases significantly when scaling beyond a small number of nodes due to a lacking implementation of a scalable consensus mechanism and the potential dynamic aspects of a blockchain network.

Embodiments of the present invention may include a hierarchical consensus optimization ("HCO") system 100, described below, which provides a method for enabling potentially thousands of nodes to participate in a blockchain network by optimizing the time required to reach consensus based on the dynamic nature of the blockchain network. Such participation is not currently viable given current permissioned blockchain networks, enterprise security standards, and enterprise TPS standards. HCO system 100 may implement a hierarchical validation scheme which may exclude some consensus-related messages, without excluding nodes, in favor of performance without compromising the trust system inherent to blockchain. HCO system 100 may improve network speed and TPS in a blockchain network by reducing consensus-related message bottlenecks which contribute to increased blockchain network latency, decreased throughput, and an overall decrease in TPS. HCO system 100 may also enable a variable number of consensus levels. Furthermore, HCO system 100 may incorporate object-oriented programming principles and Transmission Control Protocol/Internet Protocol ("TCP/IP") heartbeat election protocols.

Embodiments of the present invention will now be described in detail with reference to the accompanying Figures.

FIG. 1A is a functional block diagram illustrating hierarchical consensus optimization system 100, in accordance with an embodiment of the present invention. In an example embodiment, hierarchical consensus optimization system 100 may include clusters 120A-E (hereinafter "The Clusters"), all interconnected via network 110.

In various embodiments, network 110 is a communication channel capable of transferring data between connected devices. In an example embodiment, network 110 may be the Internet, representing a worldwide collection of networks and gateways to support communications between devices connected to the Internet. Moreover, network 110 may include, for example, wired, wireless, or fiber optic connections which may be implemented as an intranet network, a local area network (LAN), a wide area network (WAN), or any combination thereof. In further embodiments, network 110 may be a Bluetooth network, a WiFi network, or a combination thereof. In general, network 110 can be any combination of connections and protocols that will support communications between clusters 120A-E.

In an example embodiment, cluster 120A may include hierarchical message manager 122A and hierarchical consensus optimizer 124A. Cluster 120A may comprise a plurality of computing devices (i.e., nodes), working together or working separately, such as more than one of a desktop computer, a notebook, a laptop computer, a tablet computer, a netbook computer, a personal computer (PC), a blade server, a networked computer appliance, a virtual device, a thin client, or any other networked electronic device or computing system capable of receiving and sending data from and to other clusters such as clusters 120B-E, via network 110, and capable of supporting the functionality required of embodiments of the invention. In an example embodiment, the above description of cluster 120A is also representative of clusters 120B-E, with clusters 120B-E containing hierarchical message manager 122B-E and hierarchical consensus optimizer 124B-E, respectively. Although the present description may make use of the term "cluster" to refer to a group of computing devices (i.e., computing nodes), it should be noted that the term "sub-group" may be used interchangeably with the term "cluster".

In an example embodiment, hierarchical message manager 122A may be a program, or subroutine contained in a program, that may operate to pass consensus-related messages among nodes within cluster 120A. Hierarchical message manager 122A may also operate to pass consensus-related messages between nodes within cluster 120A and any leader nodes in a higher hierarchical level. Hierarchical message manager 122A performs this consensus-related message passing function in order to facilitate consensus within HCO system 100. In an example embodiment, hierarchical message manager 122A may pass consensus-related messages from nodes within cluster 120A to a leader node in a higher hierarchical level and receive a consensus result from leader nodes in a higher hierarchical level. The operations and functions of hierarchical message manager 122A are described in further detail below with regard to FIG. 2. In an example embodiment, the above description of hierarchical message manager 122A is also representative of hierarchical message managers 122B-E, with hierarchical message managers 122B-E performing similar functions within their respective clusters (i.e., clusters 120B-E).

In an example embodiment, hierarchical consensus optimizer 124A may be a program, or subroutine contained in a program, that may operate to optimize a hierarchical consensus mechanism, based on the topology of the actual blockchain node network, which may reduce the number of consensus-related messages required to establish consensus for transaction validation. In optimizing the hierarchical consensus mechanism, hierarchical consensus optimizer 124A may determine a leader node for cluster 120A within the blockchain node network. Hierarchical consensus optimizer 124A may also provide a protocol to allow computing devices within cluster 120A to communicate with the selected leader node within that cluster. Furthermore, hierarchical consensus optimizer 124A may also calculate, based on the number of nodes within the blockchain network, the number of consensus-related messages required for transaction validation. Once a transaction is validated it may be added to the blockchain ledger. In an example embodiment, hierarchical consensus optimizer 124A determines a leader node among the plurality of computing devices (i.e., nodes) within cluster 120A. The operations and functions of hierarchical consensus optimizer 124A are described in further detail below with regard to FIG. 3. In an example embodiment, the above description of hierarchical consensus optimizer 124A is also representative of hierarchical consensus optimizers 124B-E, with hierarchical consensus optimizers 124B-E performing similar functions within their respective clusters (i.e., clusters 120B-E).

Figure 1B:
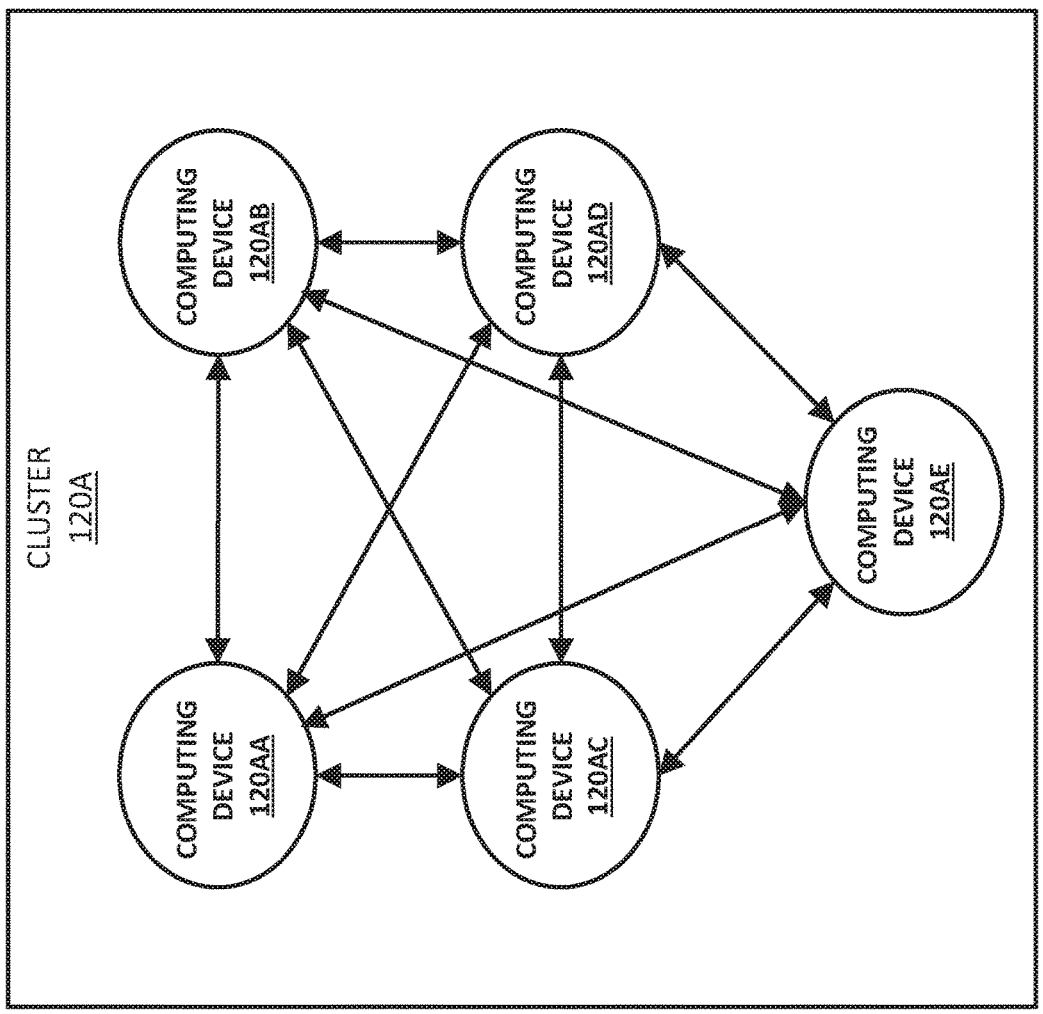
FIG. 1B is a block diagram illustrating a cluster from the hierarchical consensus optimization system of FIG. 1A, in accordance with an embodiment of the present invention.

FIG. 1B is a functional block diagram illustrating cluster 120A of FIG. 1A, in accordance with an embodiment of the present invention. As discussed above, cluster 120A may comprise a plurality of computing devices (i.e., nodes). In an example embodiment, cluster 120A may include computing device 120AA, computing device 120AB, computing device 120AC, computing device 120AD, and computing device 120AE, (hereinafter "The Computing Devices"). Furthermore, in an example embodiment, each computing device within The Computing Devices may contain an instance of the programs hierarchical message manager and hierarchical consensus optimizer. For example, computing device 120AA may include hierarchical message manager 122AA and hierarchical consensus optimizer 124AA, computing device 120AB may include hierarchical message manager 122AB and hierarchical consensus optimizer 124AB, computing device 120AC may include hierarchical message manager 122AC and hierarchical consensus optimizer 124AC, computing device 120AD may include hierarchical message manager 122AD and hierarchical consensus optimizer 124AD, and computing device 120AE may include hierarchical message manager 122AE and hierarchical consensus optimizer 124AE. Each computing device within The Computing Devices may be a desktop computer, a notebook, a laptop computer, a tablet computer, a netbook computer, a personal computer (PC), a blade server, a networked computer appliance, a virtual device, a thin client, or any other networked electronic device or computing system capable of receiving and sending data from, and to, the other computing devices within The Computing Devices, via a network such as network 110, and capable of supporting the functionality required of embodiments of the invention. The Computing Devices may be described generally with respect to FIG. 4 below. In an example embodiment, the above description of cluster 120A is also representative of clusters 120B-E, with each cluster containing five corresponding computing devices (i.e., computing nodes). In another embodiment, each computing device within the Computing Devices may represent another plurality of computing devices (i.e., computing nodes) such that a cluster (e.g., 120A) represents a cluster of clusters.

Figure 2:
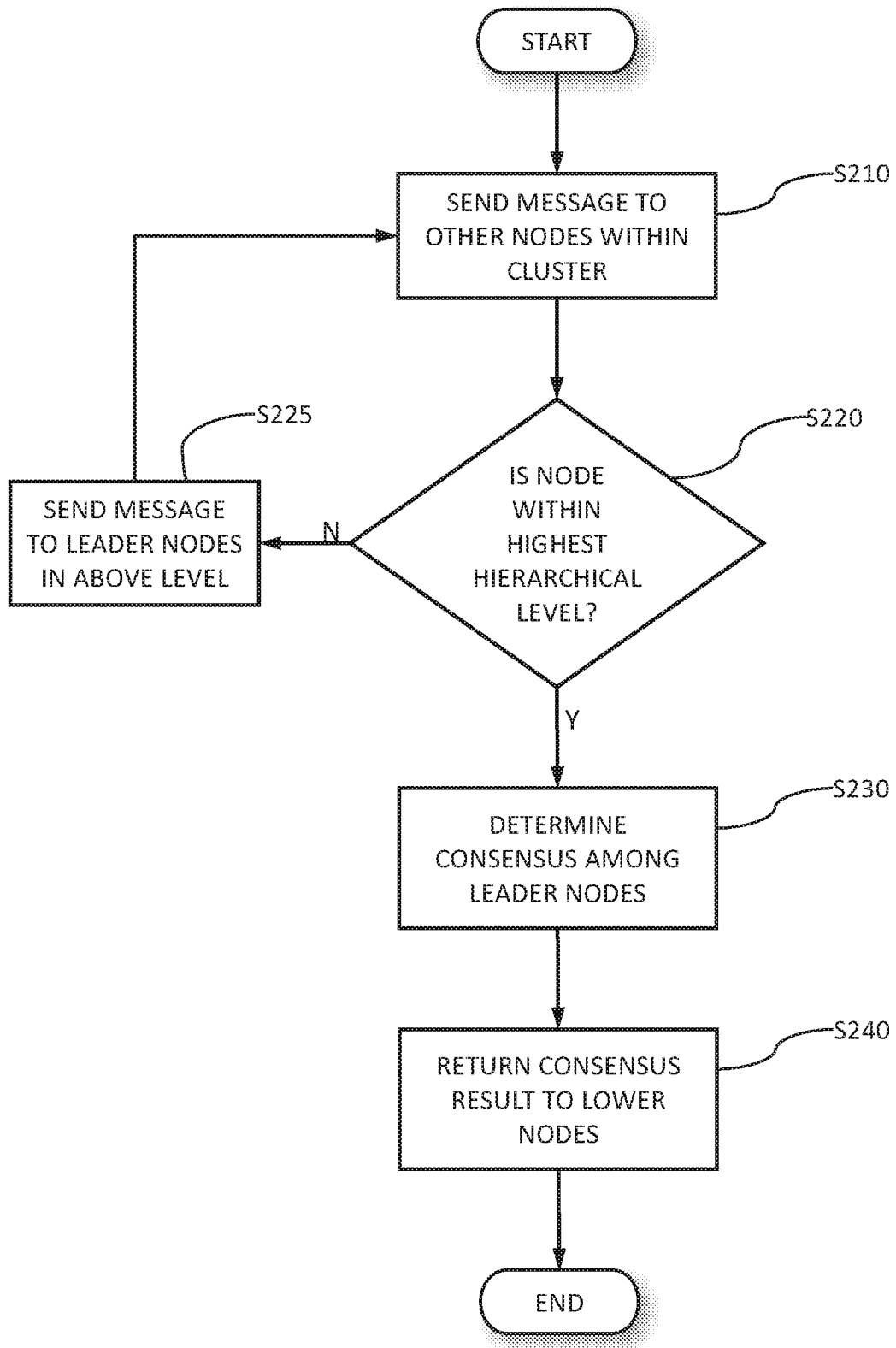
FIG. 2 is a flowchart illustrating the operations of the hierarchical message manager of FIG. 1A, in accordance with an embodiment of the invention.

FIG. 2 depicts a flowchart illustrating the message passing operation of hierarchical message manager 122A. While the following steps specify operations of hierarchical message manager 122A, it should be understood that every instance of hierarchical message manager (e.g., hierarchical message managers 122B-E, hierarchical message managers 122AA-AE) within HCO system 100 may operate in a similar manner, in accordance with an embodiment of the invention. The operations of hierarchical message manager 122A illustrated in FIG. 2 are representative of the operations of every instance of hierarchical message manager working together to facilitate consensus within HCO system 100. Referring to step S210, hierarchical message manager 122A may send a message to the other nodes in cluster 120A. The messages may include information necessary to determine consensus, or validation of an action, amongst all of the nodes in the entire system. Additionally, each message may include information from previously received messages (such as messages from clusters below it), which may add an additional level of robustness to the system.

Referring to step S220, hierarchical message manager 122A determines whether the node is in the highest level of the hierarchy. The highest level of the hierarchy is the node cluster that has no clusters, and thus no leader node, above the node cluster. If the node is in the highest level of the hierarchy, hierarchical message manager 122A proceeds to step S230. If the node is not in the highest level of the hierarchy, hierarchical message manager 122A proceeds to step S225.

Referring to step S225, hierarchical message manager 122A sends a message to all of the leader nodes in the cluster above the current cluster. The messages may include information necessary to determine consensus, or validation of an action, amongst all of the nodes in the entire system. Additionally, each message may include information from previously received messages (such as messages from clusters below it), which may add an additional level of robustness to the system.

Referring to step S230, the hierarchical message manager 122A of a node in the highest cluster may make a determination of consensus amongst all of the nodes, or performing validating action for information contained in all of the nodes. In examples in which consensus is formed, the decision may be based on consensus rules such as, for example, single master consensus, and multi-master consensus. Additionally, specific counting or quorum rules may be applied to ensure proper participation in the consensus, or validation, process.

Referring to step S240, the hierarchical message manager 122A of the upper nodes passes the consensus, or validation, result to each node that previously passed a message to it. Each node in the system may perform an action, such as updating a ledger, based on the consensus result. In an example embodiment, hierarchical message manager 122A passes the consensus result to The Computing Devices within cluster 120A.

Figure 3:
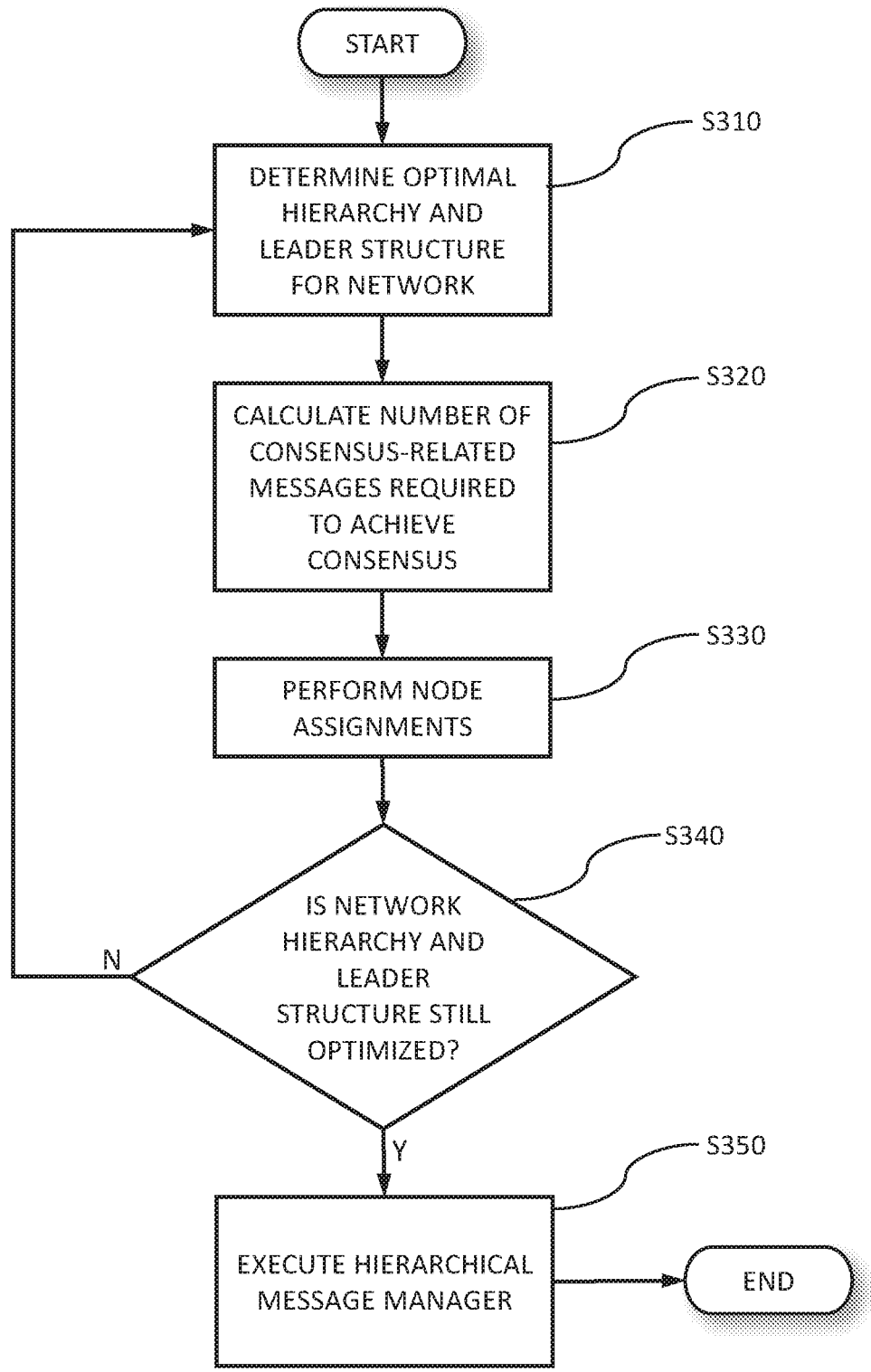
FIG. 3 is a flowchart illustrating the operations of the hierarchical consensus optimizer of FIG. 1A, in accordance with an embodiment of the invention.

FIG. 3 depicts a flowchart illustrating the operations of hierarchical consensus optimizer 124A in accordance with an example embodiment of the invention. While the following steps specify operations of hierarchical consensus optimizer 124A, it should be understood that every instance of hierarchical consensus optimizer (e.g., hierarchical consensus optimizer 124B-E, hierarchical consensus optimizer 124AA-AE) within HCO system 100 may operate in a similar manner, in accordance with an embodiment of the invention. The operations of hierarchical consensus optimizer 124A illustrated in FIG. 3 are representative of the operations of every instance of hierarchical consensus optimizer working together to facilitate consensus optimization within HCO system 100. Referring to step S310, hierarchical consensus optimizer 124A determines an optimal hierarchy and leader structure for the network. A determination of an optimal hierarchy and leader structure within a network may be based on dynamic network attributes such as, for example, changes in network size (e.g., addition/deletion of nodes), the number of transactions within a network, and node speed/processing power. Moreover, determination of an optimal hierarchy and leader structure to implement within a network may also be based on the total number of consensus-related messages transmitted by the implemented hierarchy and leader structure.

Referring to step S320, hierarchical consensus optimizer 124A may determine the quantity of consensus-related messages required to achieve consensus using the formula:

$$\text{\# Validation Messages} = (\text{\# of clusters})(\text{\# of validation messages per cluster}) + (\text{\# of validation messages between leader nodes}) + (\text{\#validation messages between non-leader nodes to leader nodes}) \quad (2)$$

which in a 2-tiered hierarchy having uniform cluster size may be represented as, $$(k)((j)(j-1)/2)+(k)(k-1)/2+(j)(k)(k) \quad (3)$$

where j is the number of nodes per cluster and k is the number of clusters. In an example embodiment of a two-level hierarchical consensus architecture, as depicted across FIGS. 1A and 1B, hierarchical consensus optimizer 124A may determine that the number of required validation messages to achieve consensus is equal to (5) ((5)(4)/2)+(5)(4)/2+(5) (5) (5)=185 messages. In requiring 185 validating messages to reach consensus, hierarchical consensus optimizer 124A only observes 62% of validation messages, as compared to 300 messages required in the non-hierarchical consensus approach (i.e., # Validation Messages=(n) (n−1)/2, where n is the number of nodes), where all blockchain network nodes are connected to each other (across clusters) and where consensus requires that each node check the consensus-related messages ("validation messages") from every other node in the blockchain network.

Under a hierarchal consensus approach, non-leader nodes, at each level, look to all leader nodes in the above level for their consensus results. In an example embodiment, all nodes in cluster 120A look to leader nodes of clusters 120A-E, all nodes in cluster 120B look to leader nodes of clusters 120A-E, all nodes in cluster 120C look to leader nodes of clusters 120A-E, all nodes in cluster 120D look to leader nodes of clusters 120A-E, and all nodes in cluster 120E look to leader nodes of clusters 120A-E. In doing so, an additional level of verification and security is added to the hierarchical consensus mechanism. Moreover, under the non-hierarchical consensus approach, the longest network latency is at every node (waiting for all nodes to communicate back and forth), whereas under the hierarchical consensus approach of HCO system 100, the longest network latency is the duration for local consensus per cluster added to the duration of checking with leader nodes at an above level.

Notwithstanding the two-level hierarchical consensus architecture, as depicted by FIG. 1A in conjunction with FIG. 1B (clusters 120A-E, each having five computing devices), it should be noted that the hierarchical consensus mechanism of HCM system 100 can be extended to n-levels. It should also be noted that in other embodiments each cluster may have a variable number of nodes.

Referring to step S330, each node is assigned a cluster, and a hierarchy level. The hierarchy may include the highest level of the hierarchy in which the node is part of a cluster, and thus that node is a leader in all of the clusters below that level of hierarchy. In an example embodiment, hierarchical consensus optimizer 124A may implement leader node selection via TCP/IP heartbeat election. A heartbeat is a type of a communication packet that is sent between cluster nodes. Each cluster node sends heartbeat messages at specific intervals to other cluster nodes, and expects to receive heartbeat messages from the other cluster nodes at specific intervals. The selection of a leader node may be randomized among the received heartbeat messages from the other cluster nodes. In another embodiment, leader node selection may be configured during network instantiation (e.g., leader node selection may be based on node speed/processing power). In an example embodiment, hierarchical consensus optimizer 124A selects one leader node for cluster 120A, from among the computing devices (e.g., computing devices 120AA-AE) within cluster 120A.

Referring to step S340, consensus optimizer 124A monitors the network to determine changes. If the system sufficiently changes such that the node assignments of step S330 are not optimal, or not within a threshold value of the optimal solution, the hierarchical consensus optimizer 124A returns to step S310 to determine an optimal hierarchy for the system. If the node assignments of step S330 are still optimal, hierarchical consensus optimizer 124A proceeds to step S350.

Referring to step S350, consensus optimizer 124A may facilitate consensus within the network based on the determined optimal hierarchy, calculated number of required consensus-related messages, and node assignments. In an example embodiment, consensus optimizer 124A may execute hierarchical message manager 122A to facilitate consensus within HCO system 100 based on the determined hierarchy and leader structure of step S310, the calculated number of required consensus-related messages of step S320, and the node assignments of step S330.

Figure 4:
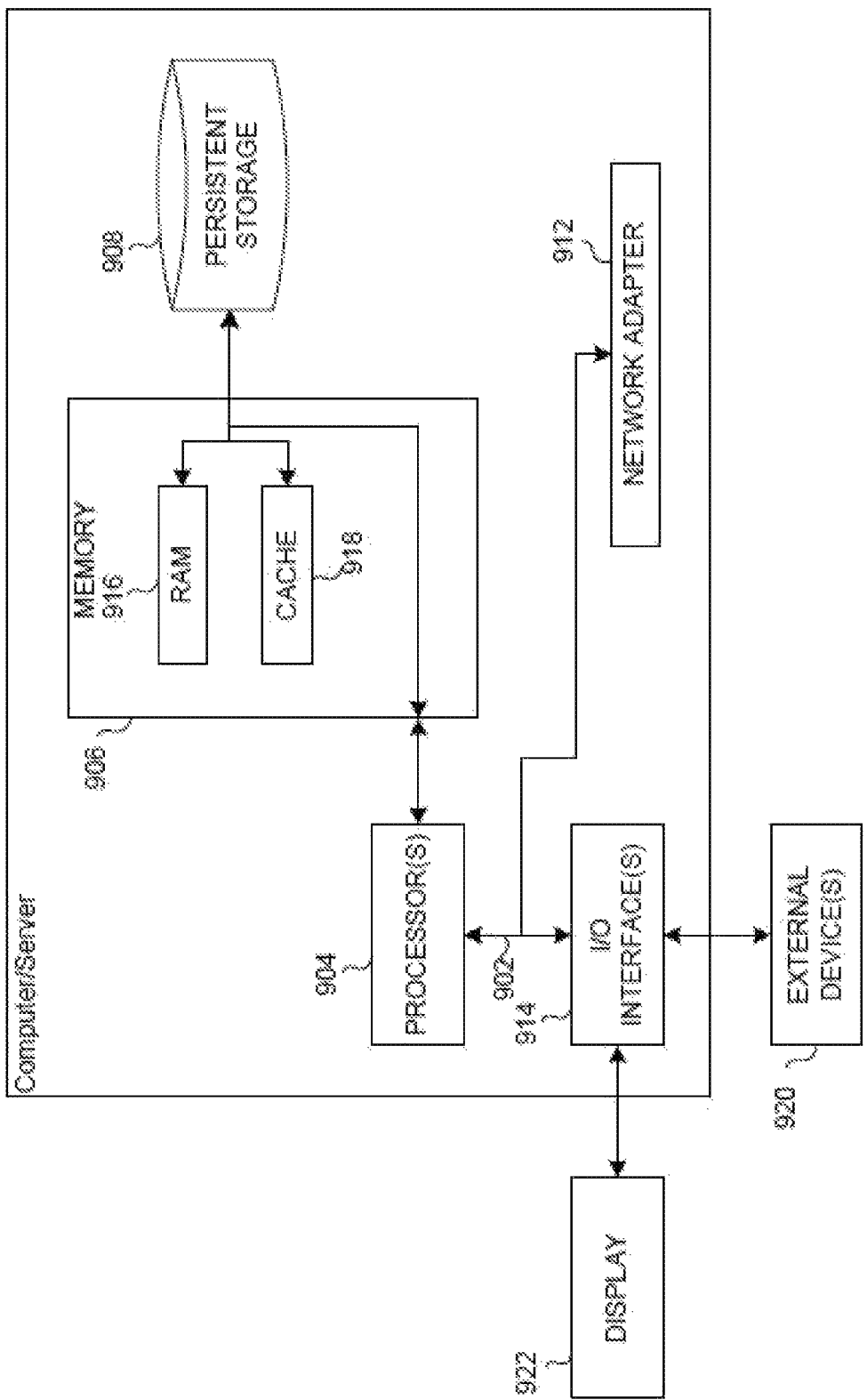
FIG. 4 is a block diagram depicting the hardware components of the hierarchical consensus optimization system of FIG. 1A, in accordance with an embodiment of the invention.

FIG. 4 depicts a block diagram of components of computing devices 120AA-AE, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing devices 120AA-AE include communications fabric 902, which provides communications between computer processor(s) 904, memory 906, persistent storage 908, network adapter 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The programs hierarchical message manager 122A and hierarchical consensus optimizer 124A within cluster 120A are stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Network adapter 912, in these examples, provides for communications with other data processing systems or devices. In these examples, network adapter 912 includes one or more network interface cards. Network adapter 912 may provide communications through the use of either or both physical and wireless communications links. The programs hierarchical message manager 122A and hierarchical consensus optimizer 124A within cluster 120A may be downloaded to persistent storage 908 through network adapter 912.

I/O interface(s) 914 allows for input and output of data with other devices that may be connected to computing devices 120AA-AE. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., programs hierarchical message manager 122A and hierarchical consensus optimizer 124A, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
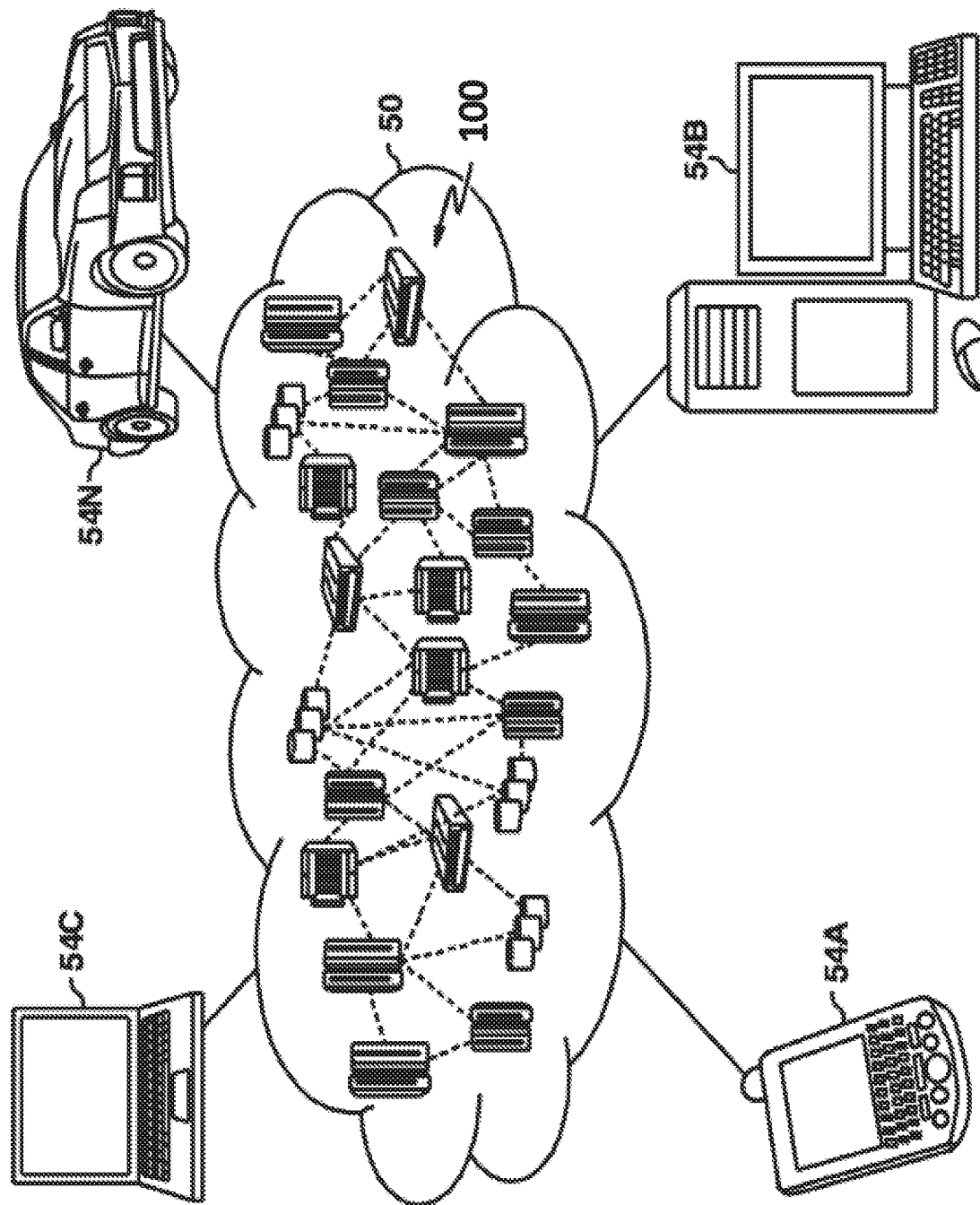
FIG. 5 depicts a cloud computing environment in accordance with an embodiment of the present invention.

Referring now to FIG. 5, illustrative cloud computing environment 50 is depicted. As shown, cloud computing environment 50 includes one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
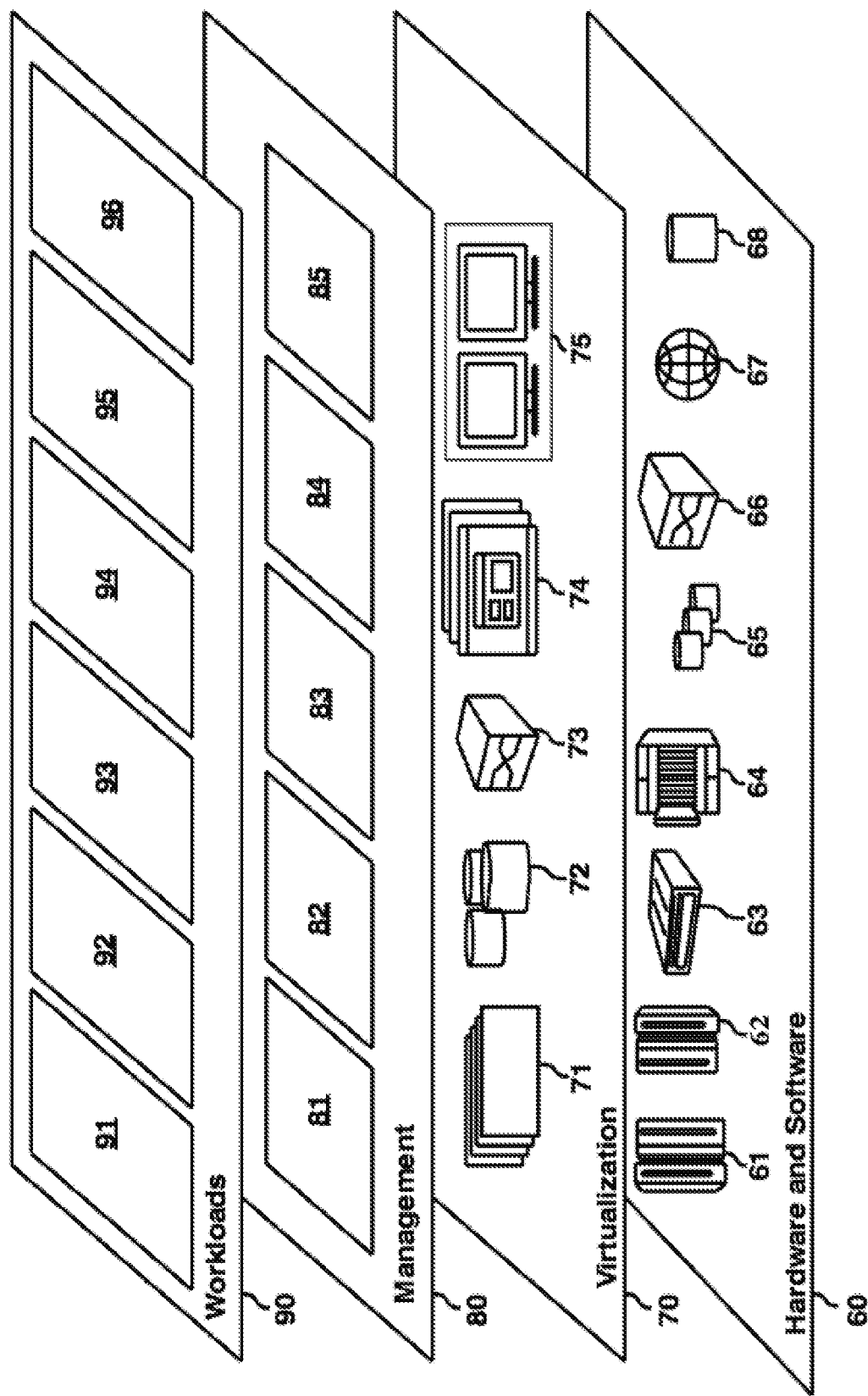
FIG. 6 depicts abstraction model layers in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and hierarchical consensus optimization system 96. Hierarchical consensus optimization system 96 may relate to implementing a hierarchical approach to consensus within a blockchain network.

The descriptions of the various embodiments of the present invention have been presented for purposes of illustration, but are not intended to be exhaustive or limited to the embodiments disclosed. The terminology used herein was chosen to explain the principles of the one or more embodiments, the practical application or technical improvement over technologies found in the marketplace, or to enable others of ordinary skill in the art to understand the embodiments. Various modifications, additions, substitutions, and the like will be apparent to those of ordinary skill in the art without departing from the scope and spirit of the invention, as defined in the following claims.

What is claimed is:

1. A method for determining a consensus amongst a plurality of computing nodes within a network, the method comprising:
   implementing a hierarchy of computing nodes, wherein the hierarchy comprises a plurality of levels, and wherein an nth level, of the plurality of levels, comprises a plurality of subgroups of computing nodes, and wherein each subgroup contains a leader computing node, and wherein an n+1 level, of the plurality of levels, includes all of the leader computing nodes of each subgroup of the nth level, and wherein a structure of the hierarchy of computing nodes is based on a total number of consensus-related messages transmitted by the implemented hierarchy of computing nodes, and wherein the total number of consensus-related messages transmitted by the hierarchy is calculated utilizing an equation $(k)(j)+x+y$, where k is a total number of subgroups of computing nodes within the hierarchy, where j is a calculated number of consensus-related messages transmitted within each subgroup of computing nodes within the hierarchy, where x is a calculated number of consensus-related messages transmitted between leader computing nodes within the hierarchy, and where y is a calculated number of consensus-related messages transmitted from non-leader computing nodes to leader computing nodes;
   transmitting consensus-related messages from a first computing node of the plurality of computing nodes to a second computing node of the plurality of computing nodes, wherein the second computing node is within a same subgroup of the first computing node, and wherein the same subgroup is located at the nth level;
   transmitting consensus-related messages from the first computing node of the plurality of computing nodes to a third computing node of the plurality of computing nodes, wherein the third computing node is a leader computing node from a different subgroup of the first computing node; and
   determining a consensus of the plurality of computing nodes within the network by computing nodes of the plurality of computing nodes located at a highest level of the plurality of levels of the hierarchy, and wherein the nth level is below the highest level.

2. The method of claim 1, further comprising:
   returning the consensus of the plurality of computing nodes, determined by the computing nodes of the plurality of computing nodes located at the highest level of the hierarchy, to the plurality of computing nodes located at the levels below the highest level of the hierarchy.

3. The method of claim 1, wherein the highest level of the hierarchy comprises a single subgroup of all the computing nodes within the highest level.

4. The method of claim 1, wherein the implemented hierarchy of computing nodes is configured based on attributes of the network, and wherein attributes of the network are selected from the group consisting of size of the plurality of computing nodes, number of transactions processed by the plurality of computing nodes, geographic disparity between computing nodes within the plurality of computing nodes, and computational processing speed of computing nodes within the plurality of computing nodes.

5. The method of claim 1, wherein the leader computing node contained within each subgroup is selected via Transmission Control Protocol/Internet Protocol heartbeat election, wherein election of the leader computing node is randomized among received heartbeat messages within a containing subgroup of computing nodes.

6. A computer program product for determining a consensus amongst a plurality of computing nodes within a network, the computer program product comprising:
   one or more computer-readable tangible storage devices and program instructions stored on at least one of the one or more computer-readable tangible storage devices, the program instructions comprising:

program instructions to implement a hierarchy of computing nodes, wherein the hierarchy comprises a plurality of levels, and wherein an nth level, of the plurality of levels, comprises a plurality of subgroups of computing nodes, and wherein each subgroup contains a leader computing node, and wherein an n+1 level, of the plurality of levels, includes all of the leader computing nodes of each subgroup of the nth level, and wherein a structure of the hierarchy of computing nodes is based on a total number of consensus-related messages transmitted by the implemented hierarchy of computing nodes, and wherein the total number of consensus-related messages transmitted by the hierarchy is calculated utilizing an equation (k)(j)+x+y, where k is a total number of subgroups of computing nodes within the hierarchy, where j is a calculated number of consensus-related messages transmitted within each subgroup of computing nodes within the hierarchy, where x is a calculated number of consensus-related messages transmitted between leader computing nodes within the hierarchy, and where y is a calculated number of consensus-related messages transmitted from non-leader computing nodes to leader computing nodes;

program instructions to transmit consensus-related messages from a first computing node of the plurality of computing nodes to a second computing node of the plurality of computing nodes, wherein the second computing node is within a same subgroup of the first computing node, and wherein the same subgroup is located at the nth level;

program instructions to transmit consensus-related messages from the first computing node of the plurality of computing nodes to a third computing node of the plurality of computing nodes, wherein the third computing node is a leader computing node from a different subgroup of the first computing node; and program instructions to determine a consensus of the plurality of computing nodes within the network by computing nodes of the plurality of computing nodes located at a highest level of the plurality of levels of the hierarchy, and wherein the nth level is below the highest level.

7. The computer program product of claim 6, further comprising:
program instructions to return the consensus of the plurality of computing nodes, determined by the computing nodes of the plurality of computing nodes located at the highest level of the hierarchy, to the plurality of computing nodes located at the levels below the highest level of the hierarchy.

8. The computer program product of claim 6, wherein the highest level of the hierarchy comprises a single subgroup of all the computing nodes within the highest level.

9. The computer program product of claim 6, wherein the implemented hierarchy of computing nodes is configured based on attributes of the network, and wherein attributes of the network are selected from the group consisting of size of the plurality of computing nodes, number of transactions processed by the plurality of computing nodes, geographic disparity between computing nodes within the plurality of computing nodes, and computational processing speed of computing nodes within the plurality of computing nodes.

10. The computer program product of claim 6, wherein the leader computing node contained within each subgroup is selected via Transmission Control Protocol/Internet Protocol heartbeat election, wherein election of the leader computing node is randomized among received heartbeat messages within a containing subgroup of computing nodes.

11. A computer system for determining a consensus amongst a plurality of computing nodes within a network, the computer system comprising:
one or more processors, one or more computer-readable memories, one or more computer-readable tangible storage devices, and program instructions stored on at least one of the one or more computer-readable tangible storage devices for execution by at least one of the one or more processors via at least one of the one or more memories, the program instructions comprising:
program instructions to implement a hierarchy of computing nodes, wherein the hierarchy comprises a plurality of levels, and wherein an nth level, of the plurality of levels, comprises a plurality of subgroups of computing nodes, and wherein each subgroup contains a leader computing node, and wherein an n+1 level, of the plurality of levels, includes all of the leader computing nodes of each subgroup of the nth level, and wherein a structure of the hierarchy of computing nodes is based on a total number of consensus-related messages transmitted by the implemented hierarchy of computing nodes, and wherein the total number of consensus-related messages transmitted by the hierarchy is calculated utilizing an equation (k)(j)+x+y, where k is a total number of subgroups of computing nodes within the hierarchy, where j is a calculated number of consensus-related messages transmitted within each subgroup of computing nodes within the hierarchy, where x is a calculated number of consensus-related messages transmitted between leader computing nodes within the hierarchy, and where y is a calculated number of consensus-related messages transmitted from non-leader computing nodes to leader computing nodes;

program instructions to transmit consensus-related messages from a first computing node of the plurality of computing nodes to a second computing node of the plurality of computing nodes, wherein the second computing node is within a same subgroup of the first computing node, and wherein the same subgroup is located at the nth level;

program instructions to transmit consensus-related messages from the first computing node of the plurality of computing nodes to a third computing node of the plurality of computing nodes, wherein the third computing node is a leader computing node from a different subgroup of the first computing node; and program instructions to determine a consensus of the plurality of computing nodes within the network by computing nodes of the plurality of computing nodes located at a highest level of the plurality of levels of the hierarchy, and wherein the nth level is below the highest level.

12. The computer system of claim 11, further comprising:
program instructions to return the consensus of the plurality of computing nodes, determined by the computing nodes of the plurality of computing nodes located at the highest level of the hierarchy, to the plurality of computing nodes located at the levels below the highest level of the hierarchy.

13. The computer system of claim 11, wherein the highest level of the hierarchy comprises a single subgroup of all the computing nodes within the highest level.

14. The computer system of claim 11, wherein the implemented hierarchy of computing nodes is configured based on attributes of the network, and wherein attributes of the network are selected from the group consisting of size of the plurality of computing nodes, number of transactions processed by the plurality of computing nodes, geographic disparity between computing nodes within the plurality of computing nodes, and computational processing speed of computing nodes within the plurality of computing nodes.

* * * * *